United States Patent [19]

Young

[11] Patent Number: 5,661,228

[45] Date of Patent: Aug. 26, 1997

[54] LIQUID PRESSURE AND LEVEL SENSING INSTRUMENTS

[76] Inventor: Wen S. Young, 23925 Clarington Dr., West Hill, Calif. 91304

[21] Appl. No.: 600,333

[22] Filed: Feb. 13, 1996

[51] Int. Cl.$^6$ ............................................. G01M 3/04
[52] U.S. Cl. .................. 73/40; 73/49.2; 73/52; 73/299
[58] Field of Search .................. 73/40, 49.2, 49.3, 73/52, 299

[56] References Cited

U.S. PATENT DOCUMENTS 1,660,814  2/1928  Persons ................................. 73/299

FOREIGN PATENT DOCUMENTS

| 1249397 | 11/1960 | France ................. 73/299 |
| 371451 | 5/1973 | U.S.S.R. ................. 73/49.2 |
| 1696882 | 12/1991 | U.S.S.R. ................. 73/299 |
| 241562 | 12/1925 | United Kingdom ........ 73/299 |
| 279688 | 11/1927 | United Kingdom ........ 73/299 |

*Primary Examiner*—Hezron E. Williams
*Assistant Examiner*—Daniel S. Larkin
*Attorney, Agent, or Firm*—Robert M. Sperry

[57] ABSTRACT

An improved liquid pressure measuring system comprising a container containing a liquid at a level to be sensed, a pressure sensing chamber located within said container and having an open bottom, a pressure sensing device connected to sense the pressure in said chamber, and means for generating gas within said chamber to balance the hydrostatic pressure of said liquid.

8 Claims, 4 Drawing Sheets

5,661,228

LIQUID PRESSURE AND LEVEL SENSING INSTRUMENTS

FIELD OF INVENTION

This invention relates to liquid pressure-sensing instruments and is particularly directed to improved instruments for measuring liquid levels and detecting leaks in liquid containers.

PRIOR ART

From basic physics, it is known that the hydrostatic pressure inside a liquid container is linearly proportional to the level of the liquid and its density. This can be expressed as a mathematical formula. Very often, the liquid density remains fairly constant. Therefore, the height of the liquid within the container can be determined by measuring the fluid pressure. Many prior art liquid level measuring devices have been developed, based upon this principle. Typically, a mechanical pressure gauge will be installed adjacent the bottom of a liquid container to indicate the pressure of the liquid at the bottom of the container and, hence, to permit ready computation of the liquid height from the foregoing formula. Alternatively, the pressure gauge can be scaled to read directly in liquid height, thereby eliminating the necessity for any computation.

More recently, the mechanical pressure gauges have tended to be replaced by electronic pressure transducers having signal transmitting means which facilitate remote sensing and control applications. However, in many instances, such as water wells and the like, it is difficult or impossible to install the pressure sensing means at the bottom of the well to be read at ground level. To overcome these difficulties, so-called "bubbler" systems have been developed commercially, in which a pressure sensing device is installed at ground level and a tube is run from the pressure sensing device to the bottom of the well. A tee joint is introduced into the tube near the pressure sensing device and a second tube connects the tee joint to a gas bottle equipped with a valve and pressure regulator. With this arrangement, the valve is opened to allow gas to flow from the gas bottle into the tubing. Then, as long as the gas pressure is higher than the liquid pressure at the bottom of the well, the gas will force the liquid downward until it reaches the bottom of the tube and escapes into the well as bubbles, whereupon the pressure sensing device will indicate the hydrostatic pressure at the well bottom. The pressure regulator and valve enable the user to adjust the gas flow to just balance the hydrostatic pressure, so as to prevent wasting the gas and introducing errors into the pressure measurement. Unfortunately, such bubbler systems require that the bubble formation be reliable and consistent. Changes in the bubble rate will adversely effect the accuracy of the pressure measurement, especially if the range of level fluctuation is large. Thus, in order to reduce measurement errors induced by level fluctuation, flow regulating mechanisms have been installed to automatically stabilize the bubble rate. However, these mechanisms increase the cost of the system and may introduce new sources of error or inaccuracy. Thus, none of the prior art liquid level measuring devices using pressure sensing techniques have been entirely satisfactory.

BRIEF SUMMARY AND OBJECTS OF INVENTION

These disadvantages of the prior art are overcome with the present invention and an improved liquid level measurement system using pressure sensing techniques is provided which is accurate and reliable, yet is simple and inexpensive to produce and install.

The advantages of the present invention are preferably attained by providing an improved liquid pressure measuring system comprising a container containing a liquid at a level to be sensed, a pressure sensing chamber located within said container and having at least a partially open bottom, a pressure sensing device connected to sense the pressure in said chamber, and means for generating gas within said chamber to balance the hydrostatic pressure of said liquid.

Accordingly, it is an object of the present invention to provide an improved liquid pressure measuring system.

Another object of the present invention is to provide an improved liquid pressure measuring system which is simple and inexpensive to install.

An additional object of the present invention is to provide an improved liquid pressure measuring system which is reliable and accurate.

A further object of the present invention is to provide an improved liquid level measuring system.

Another object of the present invention is to provide an improved liquid level measuring system which automatically balances the hydrostatic pressure of the liquid.

A specific object of the present invention is to provide an improved liquid pressure measuring system comprising a container containing a liquid at a level to be sensed, a pressure sensing chamber located within said container and having at least a partially open bottom, a pressure sensing device connected to sense the pressure in said chamber, and means for generating gas within said chamber to balance the hydrostatic pressure of said liquid.

These and other objects and features of the present invention will be apparent from the following detailed description, taken with reference to the figures of the accompanying drawing.

DETAILED DESCRIPTION OF THE INVENTION

Figure 1:
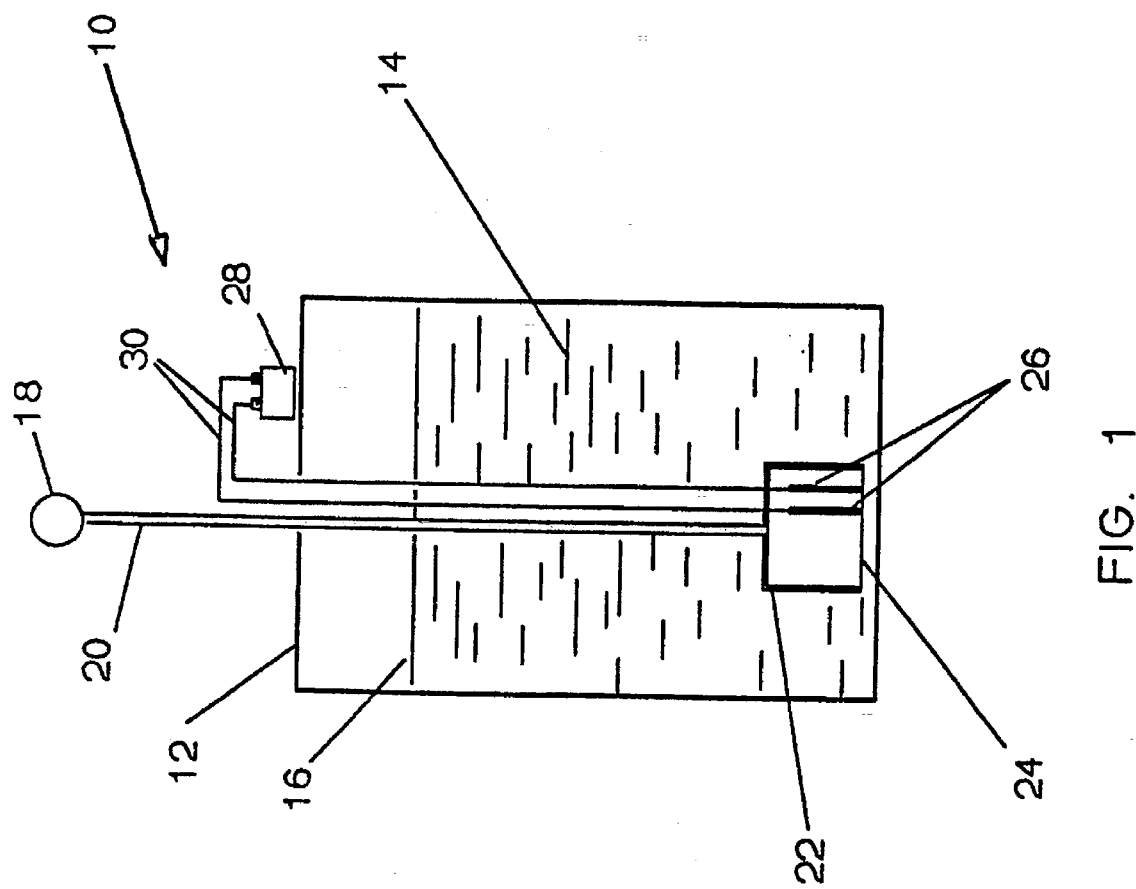
FIG. 1 is a diagrammatic representation showing a liquid container having a liquid pressure measuring system embodying the present invention.

In the form of the present invention chosen for the purpose of illustration in FIG. 1, a liquid pressure measuring system, indicated generally at 10, is shown installed in a liquid container 12 filled with liquid 14 to a level 16. A pressure gauge 18 is mounted on the upper end of a pressure sensing tube 20 which communicates, at its lower end with a pressure sensing chamber 22. The pressure sensing chamber 22 has a bottom 24 which is open to the liquid 14 and which contains a pair of electrodes 26, mounted within the chamber 22, in proximity with the open bottom 24. The electrodes 26 are energized by suitable means, such as battery 28 and wires 30.

In use with conductive liquids, such as water, when the liquid 14 rises above level 16, the rising pressure will cause the liquid 14 to enter the pressure sensing chamber 22 through the open bottom 24. However, when this happens, the liquid will come into contact with the electrodes 26, causing an electrolysis process to occur which will produce gas at one or both of the electrodes 26. The gas released by the electrolysis process will increase the pressure within the chamber 22, forcing the liquid 14 downward and out of the chamber 22. As the liquid level within chamber 22 falls, the liquid 14 will move out of contact with the electrodes 26, causing the electrolysis process to cease and stopping the production of gas by the electrodes 26. Alternatively, if the level of the liquid 14 falls below level 16, the gas within chamber 22 will expand and escape out of chamber 22 as bubbles. Thus, the gas pressure within chamber 22 will always be in equilibrium at the bottom 24 with the hydrostatic pressure of the liquid 14, regardless of the level of the liquid 14. This is critical to obtaining high accuracy measurements.

Figure 2:
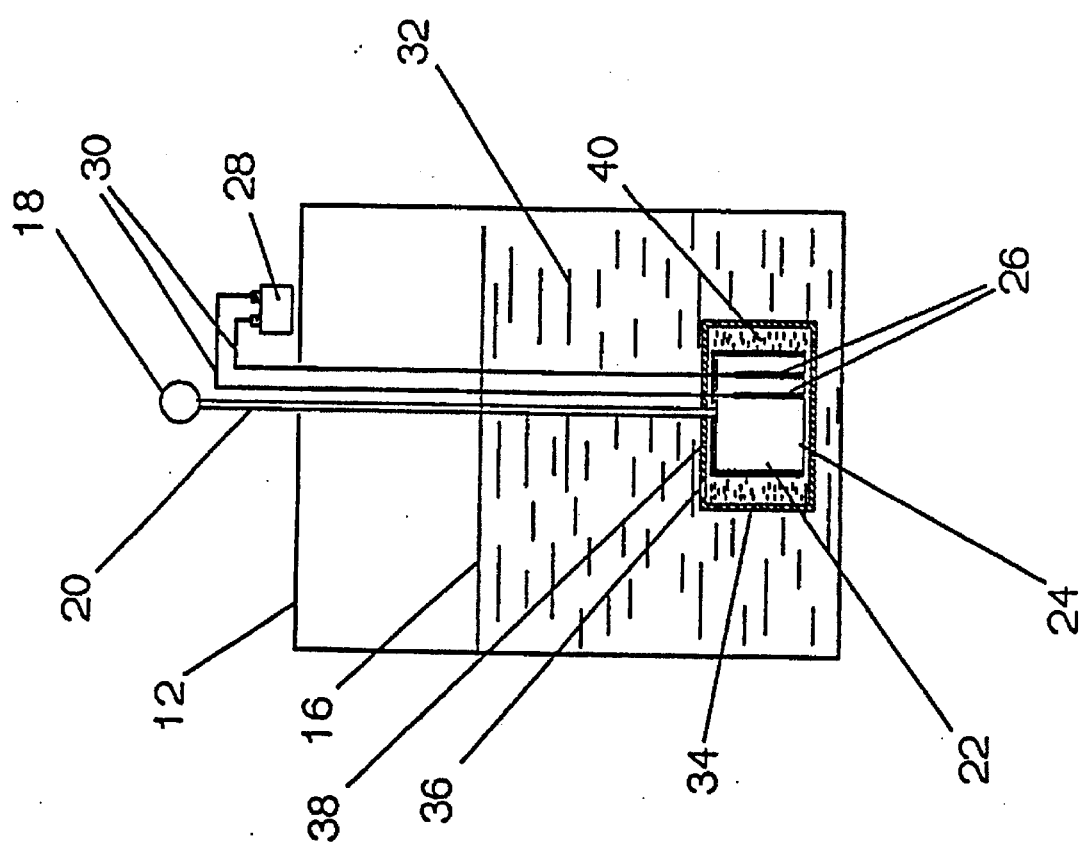
FIG. 2 is a diagrammatic representation showing an alternative form of the liquid pressure measuring system of FIG. 1.

FIG. 2 shows an alternative form of the liquid pressure measuring system 10 of FIG. 1, for use with non-conductive liquids 32, such as gasoline, diesel oil and the like. In this instance, the pressure sensing chamber 22 is enclosed within an outer chamber 34, which is closed on all sides but has an opening 36 provided in the upper side 38. The outer chamber 34 is filled with a conductive liquid 40, such as water or a water solution. Because the conductive liquid 40 is of a greater density than the non-conductive liquid 32, the conductive liquid 40 will not normally escape from the outer chamber 34, except through the slow electrolysis process which converts the conductive liquid into gas.

In use, the liquid pressure measuring system of FIG. 2 functions in substantially the same manner as described above with respect to FIG. 1. Increases in the level 16 of the non-conductive liquid 32 will cause the non-conductive liquid 32 to enter opening 36 of the outer chamber 34, forcing the conductive liquid 40 to enter the open bottom 24 of the pressure sensing chamber 22 to contact with the electrodes 26, which starts the electrolysis process to generate gas to drive the conducting liquid 40 out of the pressure sensing chamber 22 and, hence, to drive the non-conductive liquid 32 out of opening 36 and, hence, out of the outer chamber 34. Lowering of the level 16 of the non-conductive liquid 32 will allow the gas in the pressure sensing chamber 22 to expand and bubble out of the pressure sensing chamber 22 and through opening 36 of the outer chamber 34. Thus, the hydrostatic pressure within the pressure sensing chamber 22 will always be in equilibrium with that of the non-conductive liquid 32, at the precise chamber bottom level. The conductive liquid 40 inside the chamber 34 will be consumed gradually by the electrolysis process. The vacated volume will be filled with the nonconductive liquid 32. Since the nonconductive liquid 32 is lighter than the conductive liquid 40, it will occupy only the upper portion of the chamber 34. The device will continue to function as long as there is enough conductive liquid inside the chamber 34 so that the open bottom of chamber 34 is not exposed to the nonconductive liquid. In a practical application, each cubic centimeter of a conductive liquid 40, such as water, can produce almost 2000 cubic centimeters of gas under one atmosphere pressure. Thus, a chamber of 100 cc. volume can produce approximately 200,000 cc. of gas at one atmosphere pressure, enough for more than 10 years of typical application without the need to refill the conductive liquid.

Figure 3:
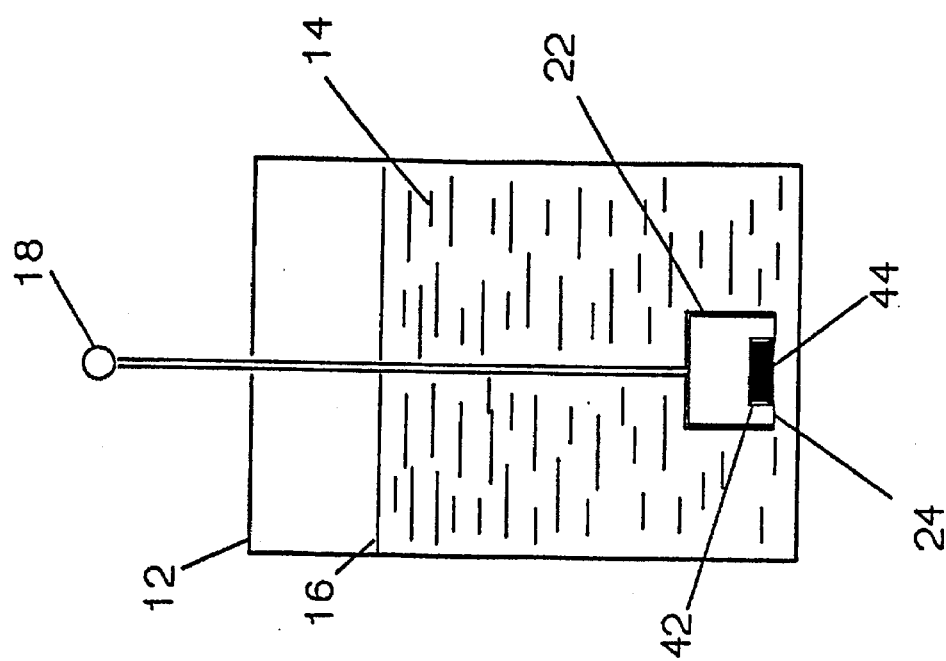
FIG. 3 is a diagrammatic representation showing another alternative form of the liquid pressure measurement system of FIG. 1.

FIG. 3 shows a non-electric alternative to the liquid pressure measuring system of FIG. 1. In this form of the present invention, electrodes 26, battery 28 and wires 30 are eliminated and are replaced by a container 42, mounted within the pressure sensing chamber 22 in proximity with the open bottom 24 and containing a quantity of a suitable chemical 44 which will react with the liquid 14 to produce a gas. For water, the chemical 44 could be calcium carbide or the like. Obviously, the specific gas-producing chemical 44 will depend upon the chemical composition of the liquid 14, however, such gas-producing chemicals are well known in the art.

Figure 4:
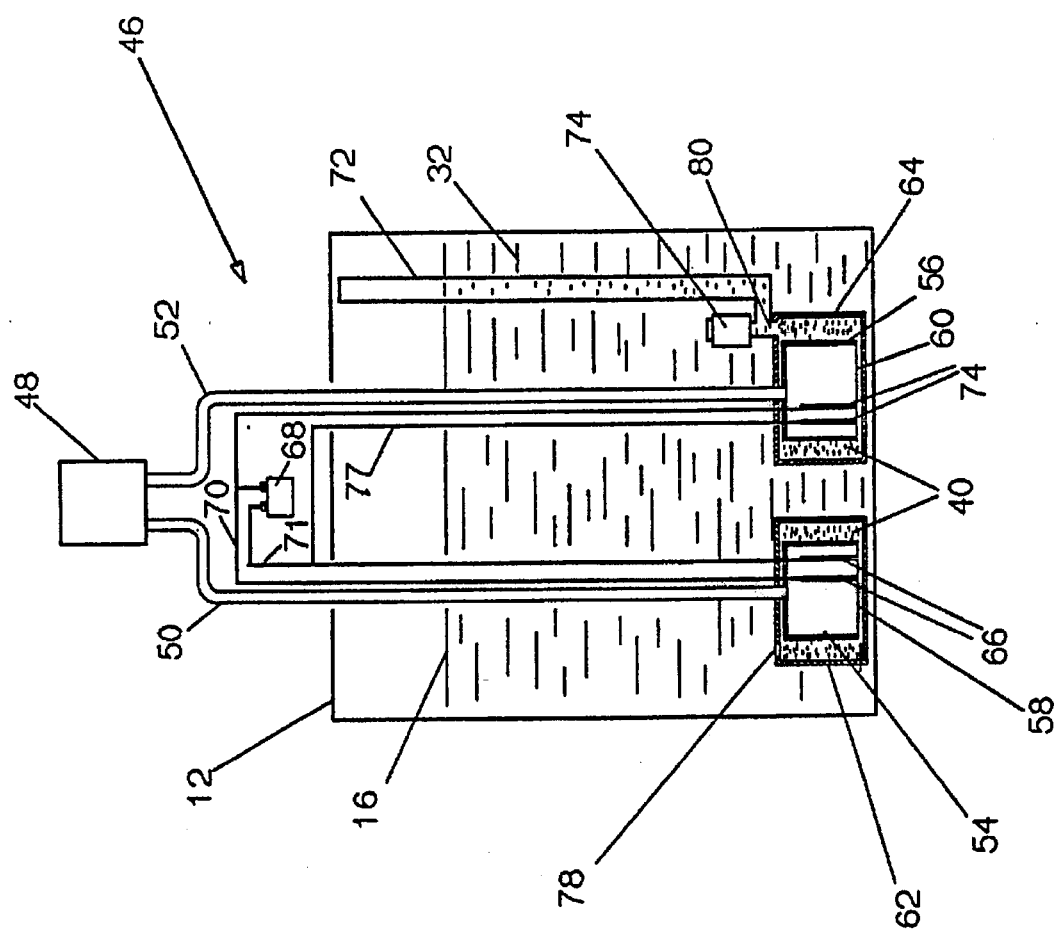
FIG. 4 is a diagrammatic representation showing a liquid container having a leak detection system embodying the liquid pressure measuring system of FIG. 1.

FIG. 4 shows a leak detection system for gasoline tanks and the like, indicated generally at 46, employing the liquid pressure measuring system of the present invention. As shown, a differential pressure transducer 48 is connected to a pair of pressure sensing tubes 50 and 52, wherein each communicates with its respective one of the pressure sensing chambers 54 and 56. The pressure sensing chambers 54 and 56 each have open bottoms 58 and 60 and are enclosed within a respective one of the outer chambers 62 and 64 which are filled with a conductive liquid 40, such as water or the like. Electrode pair 66 is mounted within sensing chamber 54 adjacent the open bottom 58 and is energized by any suitable electrical means, such as battery 68, through wires 70 and 71. Similarly, electrode pair 74 is mounted within sensing chamber 56 adjacent the open bottom 60 and is energized by battery 68 through wires 70 and 77. Outer chamber 62 has an opening 78 formed in its upper surface which communicates with the liquid 32, while outer chamber 64 has an opening 80 which communicates with a reference tube 72 through a solenoid valve 74, which is operable either to connect the interior of the outer chamber 64 to the reference tube 72 and the liquid 32, or to connect the outer chamber 64 to the reference tube 72 only.

In use, when solenoid valve 74 is open, the interiors of both outer chambers 62 and 64 and the reference tube 72 are exposed to the hydrostatic pressure of liquid 32. Consequently, the differential pressure transducer 48 will read "zero", regardless of the level 16 of the liquid 32. However, when solenoid valve 74 is closed, the interior of the outer chamber 64 is isolated from the liquid 32 and sees only the hydrostatic pressure within reference tube 72. Consequently, the hydrostatic pressure within the outer chamber 64 will be determined solely by the liquid level within the reference tube 72. If the tank 12 leaks, level 16 will fall and the hydrostatic pressure of liquid 32 will also fall. However, the hydrostatic pressure of the reference tube 72 and, hence, of the outer chamber 64 will remain constant. Therefore, the differential pressure transducer 48 will sense this difference and will indicate the existence and magnitude of the leak. Furthermore, the pressure gauge 18 of FIG. 1 must have a range covering the entire height of the container 12. For example, if the container 12 has a height of 20 feet, the pressure gauge 18 must have a range of at least 20 feet, in order to indicate the fluid level 16 throughout the entire range. Consequently, it is extremely difficult for the pressure gauge 18 to sense a level change caused by a leak, which may be only 0.001 inch of level change. In contrast, since the differential pressure transducer 48 serves only to detect leaks, it can have a full scale range of only one inch, which can easily resolve level differences of much less than 0.001 inch.

With a leak detection system as seen in FIG. 4, the shape of the reference tube 72 must be in direct proportion to the shape of the container 12. Otherwise, temperature variations in the liquid 32 will create measurement errors. The mathematical expression for the relationship between the reference tube 72 and the container 12 may be written as:

$$A_a/A_r = \text{constant at all levels L} \quad (1)$$

where $A_a$=cross-sectional area of container 12 at level L, and $A_r$=cross-sectional area of reference tube 72 at level L.

Figure 6:
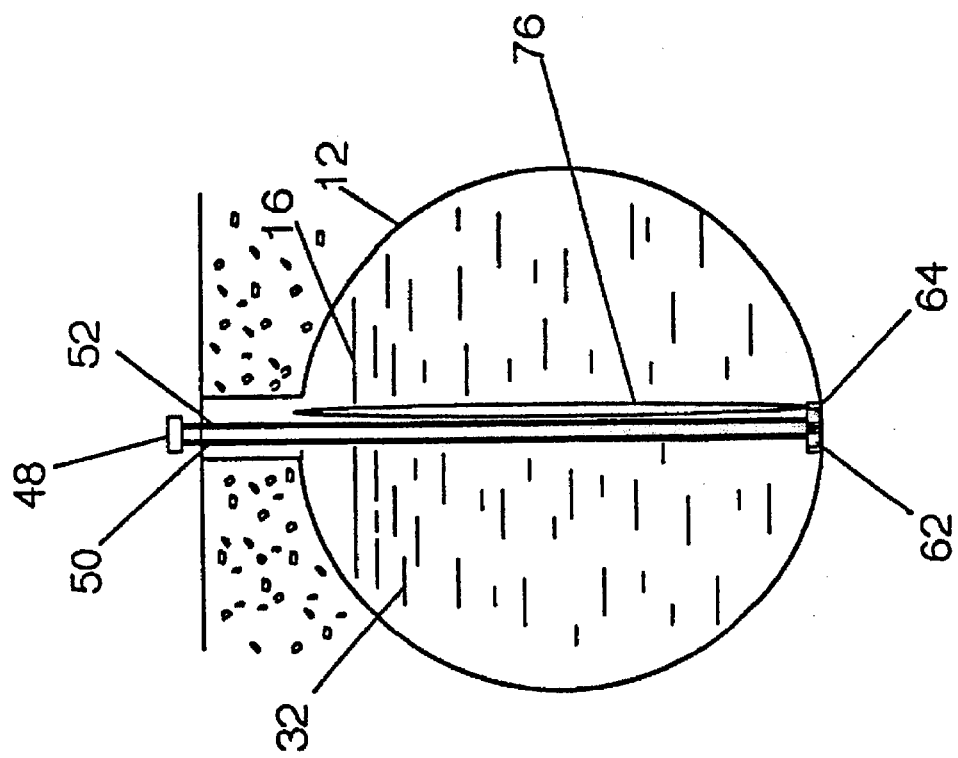
FIG. 6 is a diagrammatic representation showing the leak detection system of FIG. 5 having a reference tube shaped to compensate for the effects of temperature.
Figure 5:
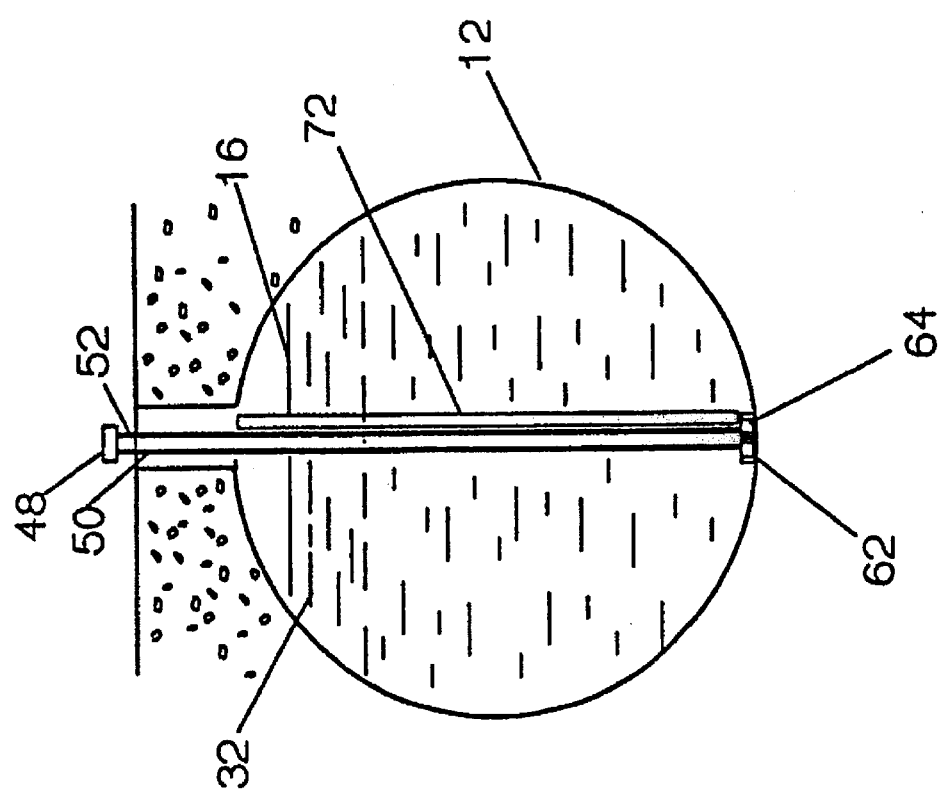
FIG. 5 is a diagrammatic representation showing an application of the leak detection system of FIG. 4.

To illustrate the above expression, consider the case where the shape of the container 12 (spherical) is different from that of the reference tube 72 (cylindrical), as seen in FIG. 5. If the liquid temperature drops during the leak detection operation, the levels of both container 12 and reference tube 72 will also drop, as a result of thermal contraction. However, the drop in container 12 will be greater than that in reference tube 72, because container 12 has a nonhomogeneous cross-section. More specifically, the cross-sectional area of the liquid surface at level 16 is less than the average cross-sectional area below the surface 16. Since more temperature contraction will take place at those levels which have larger cross-sections, the result will be a greater drop in the surface level of container 12 than the drop in the reference tube 72 for a given change in temperature. Therefore, the differential pressure transducer 48 will indicate a leak, even though none exists. To solve this problem, the reference tube 72, in FIG. 5, must be constructed in accordance with Equation 1, that is, having tapered ends and a bulbous midsection, as seen at 76 in FIG. 6. When the reference tube is constructed in this manner, any temperature change will cause proportional expansion or contraction of the liquid in container 12 and reference tube 76, so that the liquid temperature change will not cause the differential pressure to change.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A liquid pressure measuring system comprising:
   a container containing a liquid at a level to be sensed,
   a pressure sensing chamber located within said container and having at least a partially open bottom,
   a pressure sensing device connected to sense the pressure in said chamber, and
   means for generating gas within said chamber to balance the hydrostatic pressure of said liquid.

2. The system of claim 1 wherein:
   said generating means is a pair of electrodes.

3. The system of claim 1 wherein:
   said generating means is a quantity of a chemical which is reactive with said liquid to generate gas.

4. The system of claim 1 further comprising:
   an outer chamber enclosing said pressure sensing chamber and having an opening communicating with the liquid in said container.

5. The system of claim 4 wherein:
   said opening is located in the upper section of said outer chamber.

6. The system of claim 1 wherein:
   said liquid is electrically conductive.

7. The system of claim 4 wherein:
   said liquid is non-conductive, and
   said outer chamber is filled with an electrically conductive liquid.

8. The system of claim 5 wherein:
   said liquid is non-conductive, and
   said outer chamber is filled with an electrically conductive liquid of greater density than that of the liquid in said container.

* * * * *